March 1, 1949.                    M. E. BERNARD                    2,462,937
                DEVICE FOR INDICATING THE TIME OF EXPOSURE
                        FOR PHOTOGRAPHIC ENLARGEMENTS
                              Filed Aug. 7, 1945
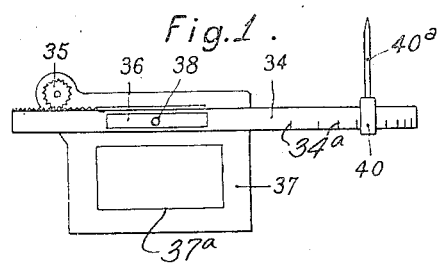
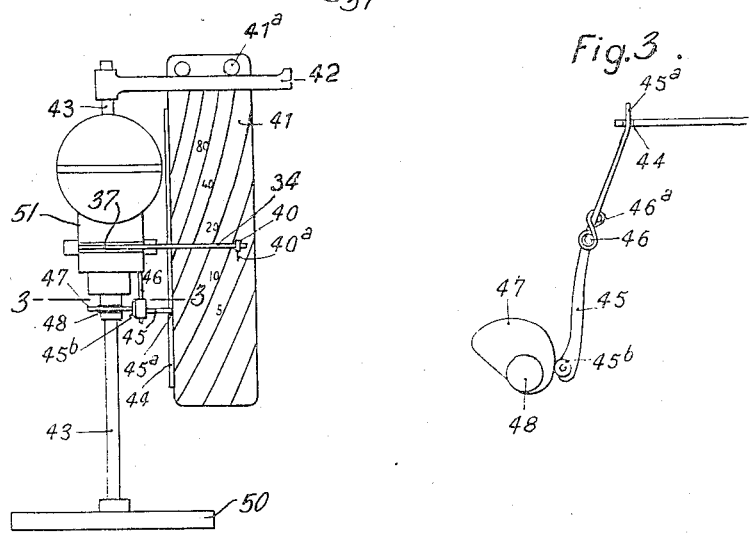
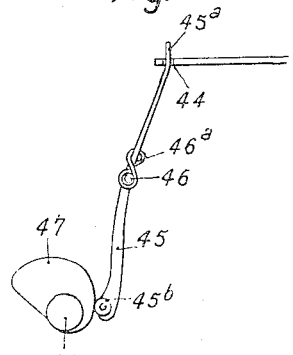
Inventor
M. E. Bernard Patented Mar. 1, 1949

2,462,937

UNITED STATES PATENT OFFICE 2,462,937

DEVICE FOR INDICATING THE TIME OF EXPOSURE FOR PHOTOGRAPHIC ENLARGEMENTS

Maurice Emile Bernard, Paris, France

Application August 7, 1945, Serial No. 609,394
In France June 26, 1944

6 Claims. (Cl. 88—24)

The time of exposure of a photographic enlargement is dependent on several factors among which the following are mentioned: the enlargement ratio, the lighting coefficient (variable opening of the diaphragm or controlled variation of the lamp voltage), the density of the negative and the sensitiveness of the paper on which printing is effected; the other factors may, without inconvenience, be considered as constant for each enlarger and under definite conditions of use (actinism and power of the printing lamp, conditions of development and developer formula).

The laws of optics enable the variation in the time of exposure to be determined by coordinating the factors of the enlargement ratio and the diaphragm opening. Moreover, it is possible to measure with the help of a density screen the density of the most opaque area of the negative and to determine, by the application of known rules, the time of exposure in function of this density. In practice, it is usual to cause the different factors to vary together and the calculation of the corresponding times of exposure, although simple, may lead to errors and is, in any case, unreliable.

The object of the invention is the provision of means for determining in a comparative manner the density of photographic negatives, which is novel in that it makes use of the enlarger itself and enables the operator to proceed during the enlargement manipulations, immediately before exposing the sensitized paper.

This invention essentially consists in projecting, with the help of the enlarger, both the negative to be enlarged and the density screen comprising a plurality of areas of increasing densities provided with reference marks and placed on the negative holder near the negative to be enlarged so that its image is projected next to that of the negative to be enlarged and that, by comparing on this double projection the shade of definite areas of the image of the negative to be enlarged with the shade of the images of the various marked zones of the density screen, it is possible, by a direct reading to determine the density of the negative.

Its object is, moreover, to provide an enlarging apparatus wherein the movements which various parts of the enlarger undergo, when preparing for a printing operation, are utilized to control the movement of other parts which contribute to the determination of the time of exposure to be chosen.

In the accompanying drawing wherein an improved embodiment of the invention is illustrated:

Figure 1 is a top plan view of the negative holder and adjustable density screen forming part of the invention, Figure 2 is a front elevation of the improved photographic enlarger, and Figure 3 is a horizontal sectional view on the line 3—3 of Figure 2.

The negative holder 37 of an enlarger of the usual type for enlarging photographs taken on roll films is provided with an aperture 37a for the negative and a smaller aperture 38 over which is movable a density screen 36 carried by a slide 34 movably mounted in the negative holder. The slide 34, through the medium of suitable actuating means, for example a rack and pinion 35, may slide along one side of the negative to be enlarged, the density screen moving over the opening 38 provided in the negative holder, in order to expose a selected small area of the density screen which is projected at the same time as the negative and the shade of which will be compared to that of the densest area of the negative image which is suitably isolated by means of a black paper guard provided with a hole. The end of the slide 34 is provided with a logarithmic scale 34a the markings of which are graduated in dependence upon the different grades of printing paper and the base 40 of a pointer 40a is adjustable along said slide.

A board 41 carrying a chart constituted by curves provided with numbers representing periods of exposure is suspended by rollers 41a movable on a horizontal rail 42 secured to the column 43 of the enlarger. The abscissae of the chart curves indicate the logarithms of the periods of exposure in respect of the various heights of the enlarger, said heights being represented by the ordinates.

The column 43 is mounted upon a support 50 for the printing paper and supports the vertically adjustable casing 51 in the upper portion of which the source of light (not shown) is enclosed.

The board may move on its rail, in its plane, by a shifting motion, under the action of a finger 45a engaging in a groove 44 provided along the vertical edge of the board. The finger 45a constitutes the end of lever 45 pivoted at 46 on the movable casing 51 of the enlarger; the other end of the lever carries a roller 45b held in contact, by means of a spring 46a with the profile of a cam 47 keyed to the diaphragm ring of the objective 48 mounted in the casing 51. When the cam rotates, the board is shifted by the lever 45 along the rail 42. The profile of this cam is so designed that this shifting motion is proportional to the graduations of the chart on the board 41. The period of exposure is determined by reference to the position of the pointer 40a with respect to the curves of the chart. In the event of the variation in the intensity of the lamp being obtained by variation of its voltage, the lens aperture remaining constant, the finger 45a would be connected by a suitable mechanism to the voltage control instead of being connected to the diaphragm.

It is to be understood that the above described forms of embodiment have only been given by way of example and that the invention covers all variants which exhibit its characteristic elements.

What I claim is:

1. In a photographic enlarger, a source of illumination, a negative holder arranged in operative relation to said source of illumination and provided with two apertures, one for receiving a negative, a density screen movable over the other aperture along one edge of the negative in the first mentioned aperture whereby various portions of the density screen may be moved into registration with the second mentioned aperture, said source of light being arranged to illuminate both of said apertures, and means for indicating the position of the density screen.

2. In a photographic enlarger, a support for photographic printing paper, a casing movable vertically above said support, a source of light in said casing, a negative holder mounted in said casing between said source of light and said support and provided with two apertures, one for receiving a photographic negative to be enlarged, a density screen movable over the other aperture and supported by said negative holder, both apertures being arranged to be illuminated by said source of light, a chart mounted for horizontal movement and provided with graduated markings, a pointer carried by the density screen and movable over said markings in dependence upon the position of the density screen with respect to the second mentioned aperture.

3. A photographic enlarger as claimed in claim 2, wherein said pointer is adjustable with respect to the density screen.

4. A photographic enlarger as claimed in claim 2, wherein said pointer is adjustable with respect to the density screen and graduated markings are provided to indicate the position in which said pointer is set.

5. A photographic enlarger as claimed in claim 2, provided with an adjustable light diaphragm between the negative holder and the paper support, and means for adjusting said chart in dependence upon the adjustment of said diaphragm.

6. A photographic enlarger as claimed in claim 2, provided with an adjustable light diaphragm between the negative holder and the paper support, and means for adjusting said chart in dependence upon the adjustment of said diaphragm, said pointer being adjustable with relation to said density screen to vary the factors of co-ordination between the screen and the markings of said chart.

MAURICE EMILE BERNARD.

REFERENCES CITED

The following references are of record in the file of this patent:

UNITED STATES PATENTS

| Number | Name | Date |
| --- | --- | --- |
| 1,609,972 | Sherrer et al. | Dec. 7, 1926 |
| 1,926,597 | Naumann | Sept. 12, 1933 |
| 2,124,889 | Murray | July 26, 1938 |
| 2,207,375 | Friedell | July 9, 1940 |
| 2,291,613 | Dye | Aug. 4, 1942 |

FOREIGN PATENTS

| Number | Country | Date |
| --- | --- | --- |
| 544,038 | Germany | Feb. 12, 1932 |
| 572,995 | Germany | Mar. 25, 1933 |
| 604,786 | Germany | Oct. 30, 1934 |